United States Patent [19]

Agnew et al.

[11] Patent Number: 4,509,122
[45] Date of Patent: Apr. 2, 1985

[54] METHOD FOR CONTROLLING THE FILE TRANSFER CAPABILITY OF AN INTERACTIVE TEXT PROCESSING SYSTEM THAT IS EMULATING A HOST PROCESSING SYSTEM TERMINAL

[75] Inventors: Palmer W. Agnew, Owego, N.Y.; John S. Coviello, San Jose, Calif.; Linda S. Green, Vestal; Anne S. Kellerman, Endicott, both of N.Y.

[73] Assignee: International Business Machines Corporation, Armonk, N.Y.

[21] Appl. No.: 442,817

[22] Filed: Nov. 18, 1982

[51] Int. Cl.³ .............................................. G06F 9/06
[52] U.S. Cl. .................................................. 364/200
[58] Field of Search ... 364/200 MS File, 900 MS File, 364/300

[56] References Cited

U.S. PATENT DOCUMENTS 3,891,974  6/1975  Coulter et al. ...................... 364/200
3,955,180  5/1976  Hirtle ................................... 364/200
4,077,058  2/1978  Appell et al. ....................... 364/200

Primary Examiner—Raulfe B. Zache
Attorney, Agent, or Firm—Saul A. Seinberg

[57] ABSTRACT

A method of transferring information between a host data processing system and the private storage media of an interactive text processing system, and the reverse, under control of the host while the text processing system is emulating a host terminal. All information intended to be written to or read from the text processor's diskette and commands therefor, are marked with a unique indicator that is recognized by emulation software and utilized thereby to steer said commands and information to a file transfer program and away from the emulated terminal screen. This is done in a manner that is transparent to the host which handles transferred information as though it were being written to or returned from the emulated screen.

3 Claims, 5 Drawing Figures

METHOD FOR CONTROLLING THE FILE TRANSFER CAPABILITY OF AN INTERACTIVE TEXT PROCESSING SYSTEM THAT IS EMULATING A HOST PROCESSING SYSTEM TERMINAL

BACKGROUND OF THE INVENTION

1. Field of the Invention

This invention is concerned with a method for controlling the file transfer capabilities of an interactive text processing system. More particularly, this invention is directed to achieving control of the attached diskette of an interactive text processing system while it is emulating an attached host terminal.

2. Description of the Prior Art

Several different forms are known and commonly used for representing editable or revisable documents in information handling systems. Some examples are OIIA L3 used by Displaywriter and 5520 Systems, a form often called "Two-Baker" used by 3790 and DOSF/DPCX/8100, and the DCF input form used by Document Composition Facility and Professional Office System. Displaywriter is a word processor, capable of and primarily intended for stand-alone operation, manufactured and sold by International Business Machines Corporation (IBM Corporation). It includes a diskette drive and diskette on which the drive will write documents in L3 form and from which it will read the same. It is a type of text processor commonly known as a "what you see is what you get" or interactive system. The 5520 is a shared logic, multi-station text processing and office communication system that is also sold by IBM Corporation. The 3790, classifiable as a minicomputer, is an intelligent text processing system. The 8100, which is also classifiable as a minicomputer is adapted using DOSF, a text processing package, and DPCX, a special operating system, as a text processing system. Both the 3790 and 8100 are manufactured and sold by IBM Corporation. Document Composition Facility (DCF) or SCRIPT/VS is a text processing program product sold by IBM Corporation. The Professional Office System or PROFS is a menu driven program product sold by IBM Corporation that is designed and particularly suitable for handling and managing a wide spectrum of office related tasks. It includes text processing capabilities that utilize the DCF form of editable text representation. In this type of text processing system, the operator imbeds textual matter in the document that is subsequently interpreted as one or more formatting commands and is retained in the editable document form as textual matter. This document form, when subsequently interpreted, is formatted as a whole document or batch processed.

These are several of the available text processing systems from IBM Corporation that can be employed to create, manipulate and format editable documents. There are also many other fine text processing systems and software support therefor available from other suppliers. Due to the overwhelming number of text processing systems now available, it is not uncommon to have a diverse mix of different text processors at any particular installation.

Part of that mix is created by supplying a secretary with a Displaywriter while the principal the secretary works for is given a terminal that attaches to a host data processing system. Assuming that there are methods and implementing means for transforming the incompatible document forms created by each type of text processing system so that they can be edited by the different parties using their own text system, there still exists a need to transfer any document between the secretary and principal, and the reverse, probably several times.

Therefore, in addition to transforming documents from one form to another and then back again, as required, the ability to forward documents from one system to another to take advantage of such transform capability is required. One effort in this area is DISOSS, a sophisticated and large program that enables a System/370 host to communicate with an 8100. This IBM Corporation program product is provided to permit a user to converse with the 8100 and a matching program therein DISOSS D, and thereby format a batch transfer job to be run by the host system. The dialog between DISOSS and DISOSS D is one between two good sized operating systems.

Displaywriter can use a DISOSS D analog to pass its diskette based documents to and from a host system. However, this DW analog fills all of the available DW memory leaving no room for typing tasks. Transfers must be accomplished as separate tasks that consume large amounts of DW resources and operator time. The use of resident operating systems like DISOSS D or file handling mechanisms, such as, for example, a program to implement a "get file" and "put file" arrangement, leave the burden of information transfer with the function poor interactive text processor instead of with the host system that is designed to handle such tasks.

OBJECTS AND SUMMARY OF THE INVENTION

Accordingly, it is a principal object of the present invention to provide a method for transferring a document from the storage device of an interactive text processing system to the disk of a host system or the reverse in a manner that does not adversely impact the interactive text processor.

It is also a principal object of the present invention to provide such a method wherein said transfer does not require the expansion of the interactive text processing system's memory.

It is another object of the present invention to provide a method of transferring information between a host and interactive text processing system in a manner that places the host in control of the text processor's diskette storage.

It is yet another object of the present invention to provide such methods wherein the host gains said diskette control while the text processor is emulating a terminal connectable thereto.

These and other objects of the present invention are achieved by permitting a host system to supervise and control the file transfer capability of an interactive text processing system that is emulating a host terminal. When in emulation mode, the text processor invokes a control program to force definition of identifying factors that determine the direction of transfer between host and text processor and the precise identity and location of the information to be transferred and to initiate file transfer. Once that has been accomplished, a file transfer program resident in the text processor is able to determine, by means of an express and unique identifier, whether any block of information is intended to support the emulation operation or the file transfer operation. A similar function, also responsive to said identifier, is provided for the host system.

BRIEF DESCRIPTION OF THE DRAWINGS

The invention will be described further, by way of a preferred example thereof, with reference to the accompanying drawings wherein like reference numerals have been used in the several views to depict like elements, in which.

DESCRIPTION OF THE PREFERRED EMBODIMENT

As previously noted, there are several different and incompatible forms used in which an editable document can be represented. However, due to inherent disparities between forms, it is impossible to readily move editable document data streams from one text processor to another for editing purposes although the advantages to be gleaned thereby would be significant. The typical mix of incompatible text processing systems, in even a modest installation and the investment they represent, renders such a capability important. It would be particularly advantageous to be able to move a document from a first text processing system to a second and back again, or even to a third or fourth type text processor, as many times as would be needed, to effect creation and complete editing of the document, without concern for the incompatibility of the respective document forms.

A large and increasing number of principals use data processing terminals, such as those of the IBM Corporation's 3270 family, for many tasks, particularly word processing. A concomitant number of secretaries use Displaywriters (DWs) for word processing. Connecting DWs to host data processing systems allows principals and secretaries to cooperate in the creation, editing, and distribution of text documents. This connection is made through the use of an ANR interface, including appropriate software therefor, which permits the text processor to emulate a host system terminal. The details of this ANR interface, which form no part of the present invention, can be found in "An Introduction to the IBM 3270 Information Display System", manual number GA27-3739.

OIIA L3, or Office Information Interchange Architecture Level 3, an IBM Corporation designation, a document data stream form that was previously mentioned, is the form used in IBM Corporation's Displaywriter (DW). It shall hereinafter be referred to as L3. Document Composition Facility, another IBM Corporation designation, is a second document data stream form that was also previously mentioned. This is the form used for representing editable documents using SCRIPT/VS, for example, in a VM environment on an IBM Corporation System 370 data processor. It shall hereinafter be referred to as DCF.

Figure 1:
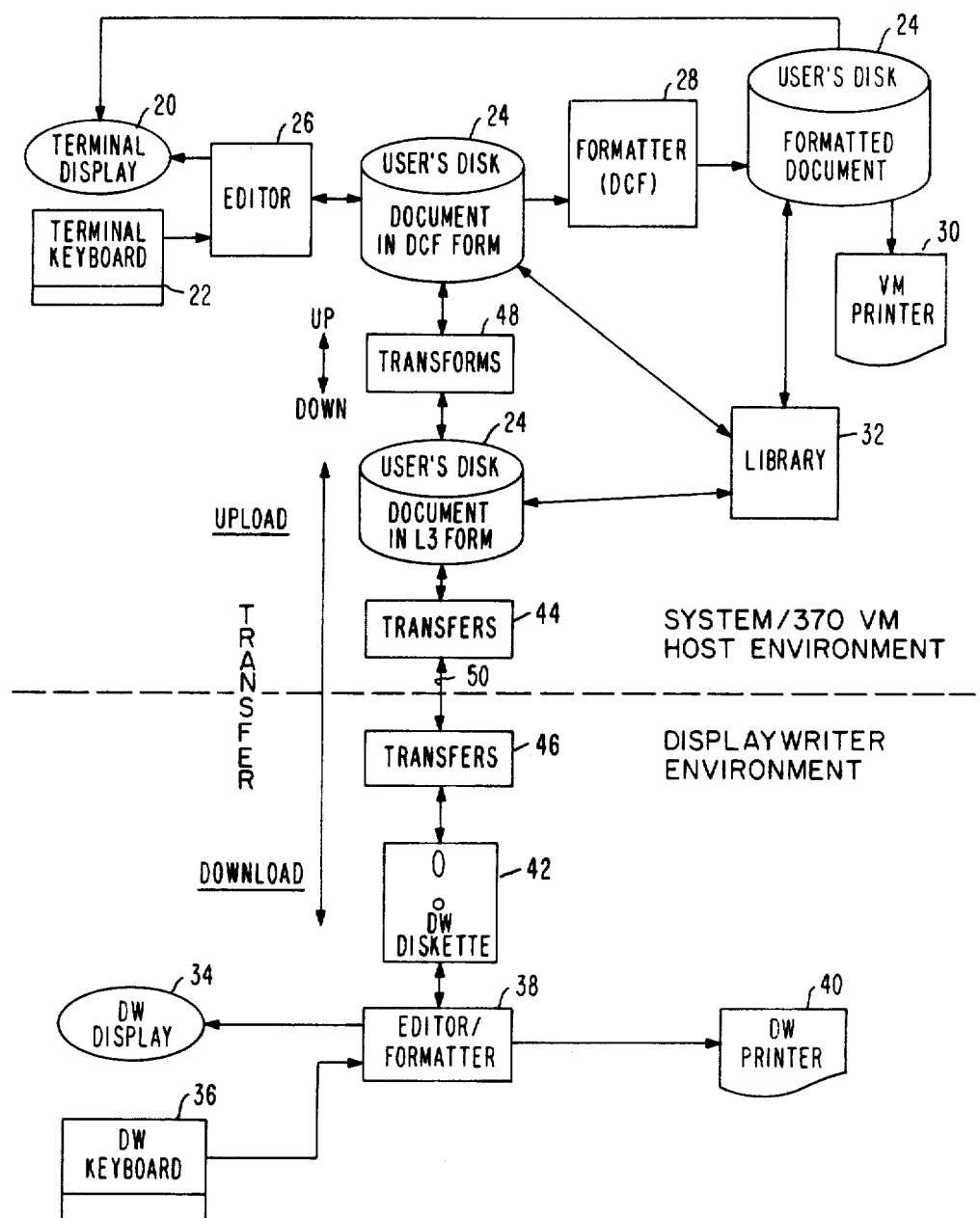
FIG. 1 schematically illustrates a simplified representation of a unified but separable configuration of a host system and an interactive text processing system adapted to transfer information from one system to the other in accordance with the subject.

One possible interconnection arrangement that can be used to couple a host processor, a System/370 operating in a VM environment, and a stand-alone Displaywriter (DW) is shown in FIG. 1. In the typical situation, a principal is provided with a terminal display 20 and a terminal keyboard 22 that are coupled to the host processor. In this example environment, the principal is also provided with other system capabilities, such as a disk 24, an editor 26 and, in this instance, a DCF (SCRIPT/VS) based formatter 28. Hard copy can be produced by spooling files to the system printer 30. In addition, if the need arises, the principal can access the system library 32 and move any appropriate file to or from their user disk 24. The library 32 is also available to the principal for archival storage purposes. The principal would create or edit a document by interacting with terminal display 20 and keyboard 22, using any additional tools as needed. The secretary, on the other hand, employs a Displaywriter to create and edit textual matter or documents. DW provides its own display 34 and keyboard 36. It is very easy to use because what you see on display screen 36 is what you will get on the printer 40.

The transform/transfer capability allows both secretaries and professionals to utilize their respective text processing and editing capabilities in a fully cooperative manner. The DCF to L3 transform allows a secretary to view and edit documents entered or edited by their principal. A related L3 to DCF transform, which uses very different methods, permits the principal to view and edit documents entered or edited by the secretary. Either transform requires a facility for host control of the DW diskette files. In referring to the transfer of documents and the transformation of document files, "UPLOAD" will be used herein to indicate movement from DW to the host and "DOWNLOAD" will be used to indicate the flow of information from the host to DW. The term "UP" signifies a transform from an L3 type document form to a DCF type document form. The term "DOWN" signifies a transform from a DCF document form to an L3 document form. Further details of the L3 to DCF transform and the DCF to L3 transform facilities can be found respectively in commonly assigned and copending patent applications by Agnew et al U.S. patent application Ser. Nos. 442,827 and 442,927 now U.S. Pat. No. 4,498,147.

Figure 2A:
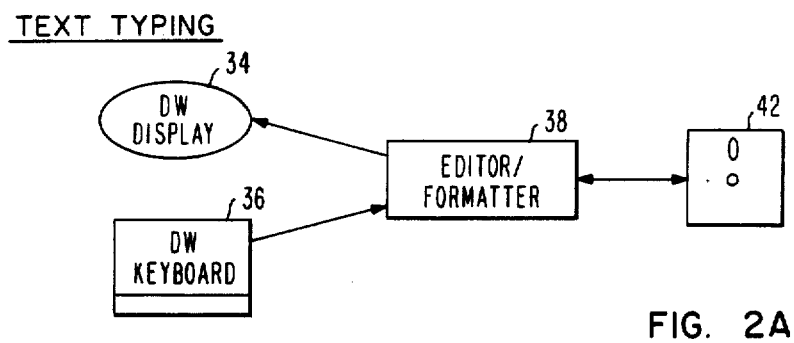
FIGS. 2A-2C shows three possible modes of operation of the text processor shown in FIG. 1.
Figure 2B:
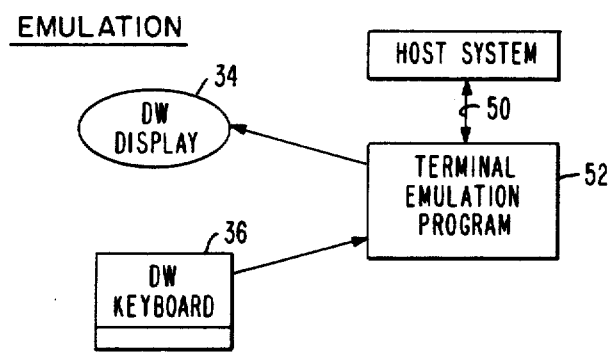
Figure 2C:
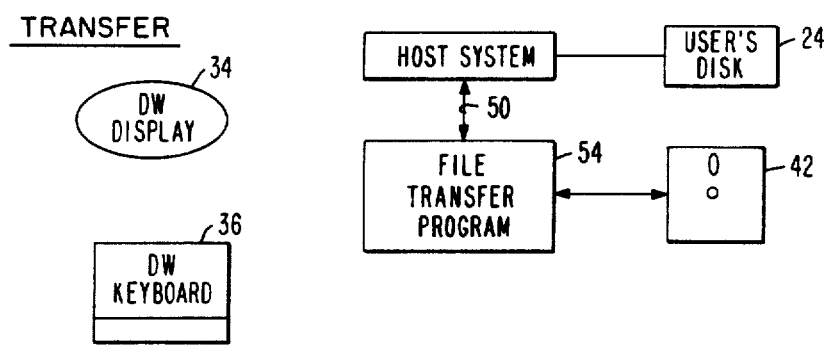

FIGS. 2A through 2C schematically depict the three operating modes of a Displaywriter that has been equipped with an ANR/host interface 50. In a first operational mode, see FIG. 2A, the DW is ready for normal text entry and editing. Under ANR and emulation software control, by means of a simple keystroke sequence, the DW can be placed in its terminal emulation mode wherein the host system converses with it believing that it is a typical terminal, such as, for example, a 3277 terminal manufactured and sold by IBM Corporation. This operational mode is shown in FIG. 2B. In addition, when desired, the DW can be switched to a transfer mode of operation wherein information can be transferred between a user's assigned host disk 24 and the private DW storage media or diskette 42.

Emulation transferring and typing capabilities can be achieved by loading the DW using a diskette containing its normal typing tasks program, which includes the editor/formatter 38, and also a diskette that includes an emulation program 52 that is compatible with the ANR interface 50 and a file transfer program 54 which constitutes an elementary diskette controller. At DW start-up, these programs are all loaded into DW memory and remain resident and accessible therein. When the DW operator wishes to run in the emulation mode, a simple predefined keystroke sequence will switch the DW from normal to emulation operation. In this instance, the keystroke sequence requires the user to simultaneously press the "CODE" and "ENTER" keys. The operator can thereafter toggle between the normal text entry mode and the emulation mode by repeating the above-given keystroke sequence.

The emulation capability need be loaded just once a day, so no re-loading of that diskette or re-logging onto the host is required when changing modes. The text entry mode is suspended when the emulation mode is selected and vice versa. Either mode can be resumed where it left off when the user returns thereto. Moreover, even if file transfer has been initiated and is running, the user may return to and utilize the DW text entry mode as long as he does not wish to edit the same document being transferred. The ANR line remains alive while in the text typing mode. No re-logon is required when returning to the emulation mode. Further, messages can be received over the ANR line even when the DW is in typing mode. The operator is advised that the invisible terminal screen has been updated by a flashing "message" indicator on the visible DW screen. This invites the operator to toggle into the emulation mode and review updated terminal screen.

Figure 3:
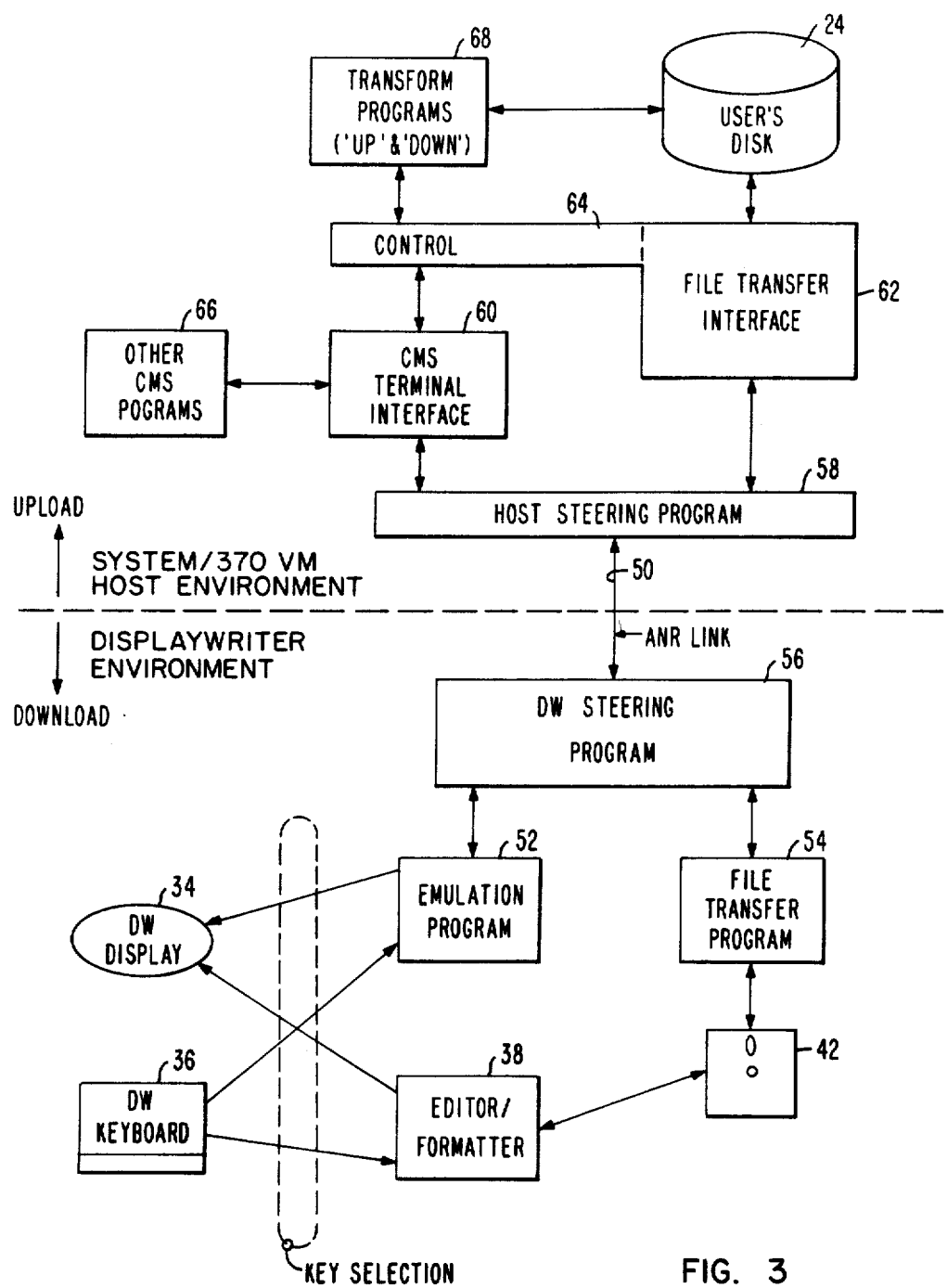
FIG. 3 schematically depicts the functional relationships of the host and text processing systems, particularly when said text processing system is in its emulation or transfer operating modes.

The file transfer capability functions in the manner explained below. It is schematically illustrated in FIG. 3. The user first types in a document and has it saved to a diskette or merely places a diskette containing the document of interest in the diskette drive. The user then types a message or keyword on the keyboard which indicates that a transfer is to take place. This embodiment of the present invention uses the term "DHI-RUN" to invoke the transfer mode, but any other predefined message would be satisfactory.

The trigger message is passed, via the ANR link 50, to a Host Steering Program 58. It serves to watch the ANR link 50 and determine, by examining the flow of information thereon, whether a particular block of information should be steered to the CMS Terminal Interface 60 or to the File Transfer Interface 62. That decision is made by ascertaining if a block of information is headed by a predetermined unique and otherwise unused ANR attribute byte. In this instance, the start transfer message reaches the CMS Terminal Interface 60 where it invokes and runs the program Control 64 as it would run any of the other CMS programs 66, if asked to. The File Transfer Interface 62 portion of Control 62 then takes over and continues the file transfer process. It is important to note that the operating location of Control 64, in the host, permits the Displaywriter to be utilized as normally encountered, without the need for additional memory, a significant slowdown in usage or the imposition of constraints on use of the DW while file transfer takes place.

The Control Program 64 may read a parameter file that contains all of the information necessary for the file transfer to take place. In all probability, with this type of capability, the user will have pre-edited the parameter file to include all of the necessary information needed for the transfer. Typically, this would include the name of the document and of the diskette for the DW environment and the file name, type and mode for the host environment. In addition, the user would also specify whether an upload or download was to take place. That information might also be solicited by means of a menu or response to programmed prompts placed on the emulated terminal screen by the CMS Terminal Interface 60. In any event, the proper and necessary information is thereby made available to Control Program 64.

When that aspect of the transfer is over, the File Transfer Interface 62 prepares a block of information for the File Transfer Program 54, which block is headed by the unique identifier byte noted above. When that block of information passes over the ANR link 50, it is interrogated by the DW Steering Program 56. When the unique identifier is encountered, the DW Steering Program "knows" that this block of information is not the next emulated terminal screen and so it is passed to the File Transfer Program 54.

That block of information, assuming an upload is specified, will be a "File Open" command for the named document file on the named diskette. Subsequent blocks of information will be several "Read" commands. The information read from the named document file, in response to each read command, will be passed back to the File Transfer Program 54, which places the unique identifier in front of it so that it will be steered back to the File Transfer Interface 62 which will then write it out to the user's disk 24. Information is continued to be read in this fashion until an End of File marker is detected whereupon the File Transfer Program is sent a "Close File" command that terminates the transfer. This action places an L3 form document on the user's disk where it can be reached by "UP" 68 for transformation to DCF form if desired.

In the case of a download, the transfer of information to the diskette is preceded by an "Open File" command, followed by an appropriate number of "Write" commands in blocks that also contain the records of data to be written. When the end of the L3 document form is reached, a "Close File" command is sent to the "File Transfer Program" 54 and the download transfer is terminated. Note that a download transfer initially requires a diskette having the proper name and sufficient room to accept the file to be downloaded to be in the DW drive.

It should also be noted that all blocks of information that belong to or command a file transfer are preceded with a unique steering byte. This insures that the information is forwarded to the correct program in both the host and DW environments. The use of the unique identifier prevents the transferred information from being mistaken for terminal screen data by either the Emulation Program 52 or the CMS Terminal Interface 60.

The actual programs required to implement the functions described herein, such as the File Transfer Program 54 or the File Transfer Interface 62, are considered to be within the ability of a programmer having ordinary skill in this art. It is the combination of functions that enable file transfer under host control, which combination is implemented by the programming, that constitutes the present invention.

Many specific details of the implementation of the present invention, as set forth generally in this description of an embodiment thereof, will be found in Appendix A of the aforementioned patent applications by Agnew et al. To the extent necessary, this appendix is incorporated herein by reference.

Although the present invention has been described in the context of a preferred embodiment thereof, it will be readily apparent to those skilled in the appertaining art, that modifications and variations can be made therein without departing from its spirit and scope. Accordingly, it is not intended that the present invention be limited to the specifics of the foregoing description of the preferred embodiment. Instead, the present invention should be considered as being limited solely by the appended claims, which alone are intended to define its scope.

Having thus described our invention, what we claim as new and desire to secure by Letters Patent, is as follows:

1. In cooperation with a hardware link and programming therefor that allows an interactive text processing system emulate a host data processing system terminal, a method for transferring information between a user's host disk and the private storage media diskette of said text processor, said method comprising the steps of:
   (a) placing a master program to control information transfer in the host environment;
   (b) placing an elementary diskette control program, responsive to said master control program, in the text processing environment; and
   (c) prefacing all blocks of information intended to flow between said user's disk and said diskette with a unique identifier that is recognized by said terminal emulation programming as not belonging to said emulation function so that it may be steered to said master program or said diskette control program, as required.

2. The method according to claim 1 which comprises the additional step of having said master control program interrogate the user, prior to information transfer, via the emulated terminal, to solicit identifying information for the disk file and diskette parameters involved in the upcoming transfer and to fix the direction of transfer desired.

3. The method according to claim 1 which comprises the additional steps of providing a host steering program, using it to interrogate all information blocks entering the host environment from said text processing environment, detecting said unique transfer information identifier and thereby ascertaining which of said blocks of information are to be steered to said master control program.

* * * * *